US005542690A

United States Patent [19]

Kozicki

[11] Patent Number: 5,542,690

[45] Date of Patent: Aug. 6, 1996

[54] WHEELCHAIR FOR CONTROLLED ENVIRONMENTS

[75] Inventor: Michael N. Kozicki, Tempe, Ariz.

[73] Assignee: Forth Research, Inc., Scottsdale, Ariz.

[21] Appl. No.: 357,989

[22] Filed: Dec. 16, 1994

Related U.S. Application Data

[63] Continuation of Ser. No. 41,269, Apr. 1, 1993, abandoned.

[51] Int. Cl.[6] ...................... B62M 1/14

[52] U.S. Cl. ...................... 280/304.1; 280/650; 280/855; 180/907; 297/42; 297/219.1

[58] Field of Search ...................... 280/250.1, 304.1, 280/650, 657, 42, 647, 855, 856; 180/907, 65.2, 65.8; 297/314, DIG. 4, 42, 16.1, 16.2, 219.1, 225

[56] References Cited

U.S. PATENT DOCUMENTS

| | | | |
|---|---|---|---|
| 329,623 | 11/1885 | Coleman | 280/42 |
| 2,369,040 | 2/1945 | Grady | 280/250.1 |
| 2,649,309 | 8/1953 | Deissner | 280/42 |
| 2,740,643 | 4/1956 | Gordon et al. | 280/158 |
| 2,798,565 | 7/1957 | Rosenthal et al. | 180/907 |
| 3,231,293 | 1/1966 | Loustaunau | 280/211 |
| 3,674,310 | 7/1972 | Montagano | 280/250.1 |
| 3,896,891 | 7/1975 | Miltenburg et al. | 180/907 |
| 4,323,133 | 4/1982 | Williams | 280/42 |
| 4,385,769 | 5/1983 | Molino | 280/304.1 |
| 4,436,320 | 3/1984 | Brudermann et al. | 280/250.1 |
| 4,484,250 | 11/1984 | Rzepecki et al. | 361/220 |
| 4,605,239 | 8/1986 | Warfel | 280/158 R |
| 4,770,432 | 9/1988 | Wagner | 280/250.1 |
| 5,028,064 | 7/1991 | Johnson | 280/304.1 |
| 5,253,888 | 10/1993 | Friedrich | 280/304.1 |
| 5,328,183 | 7/1994 | Counts | 280/650 |

FOREIGN PATENT DOCUMENTS

| | | | |
|---|---|---|---|
| 0060913 | 9/1982 | European Pat. Off. | 280/304.1 |
| 3505234 | 8/1986 | Germany | 280/250.1 |
| 9005515 | 5/1990 | WIPO | 280/250.1 |
| 9117877 | 11/1991 | WIPO | 280/250.1 |

*Primary Examiner*—Anne Marie Boehler
*Attorney, Agent, or Firm*—Cahill, Sutton & Thomas, P.L.C.

[57] ABSTRACT

A wheelchair for controlled environments includes a pair of tubular sideframes interconnected by a seat and a backrest. Sockets are welded to the sideframes for receiving pins on the underside of the seat. The position of the backrest is adjustable and the backrest is separated from the seat by a gap to avoid trapping contaminants. All metal components of the wheelchair have in integral outer surface. Tacky rollers clean the wheels as the wheelchair rolls and mechanically couple a power unit to the rear wheels. The power unit is controlled from a keyboard attached to a tubular armrest on the wheelchair. Control and signal cables from the keyboard are located within the armrest. A protective garment is provided with the wheelchair to contain contaminants in the clothing of the user and to protect the user.

19 Claims, 3 Drawing Sheets

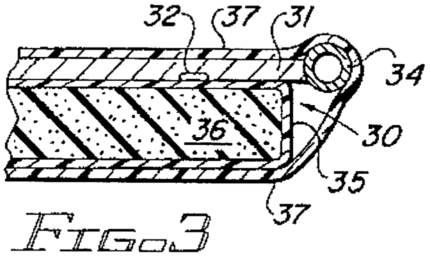
FIG. 3
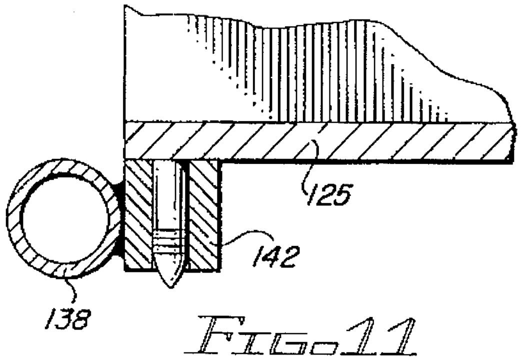
FIG. 11
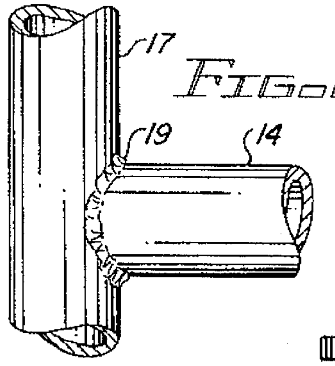
FIG. 2
FIG. 8
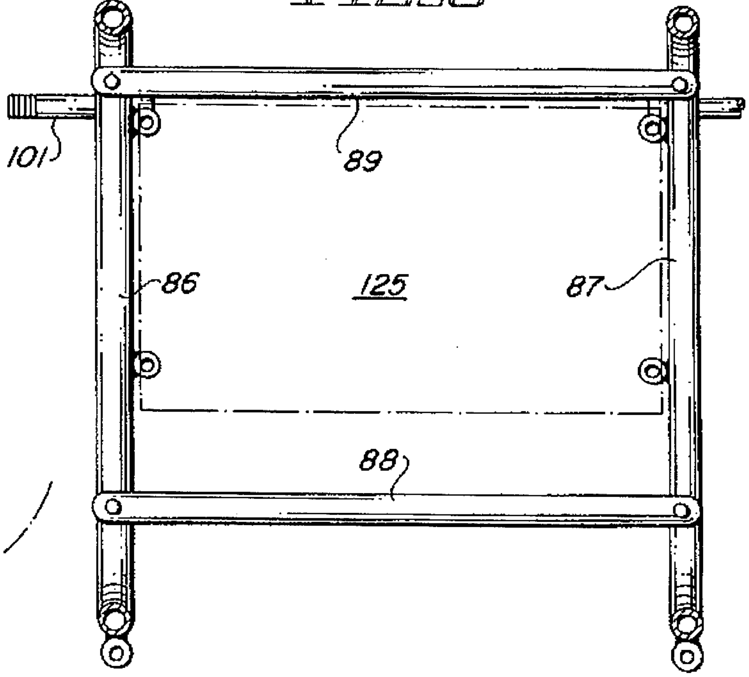
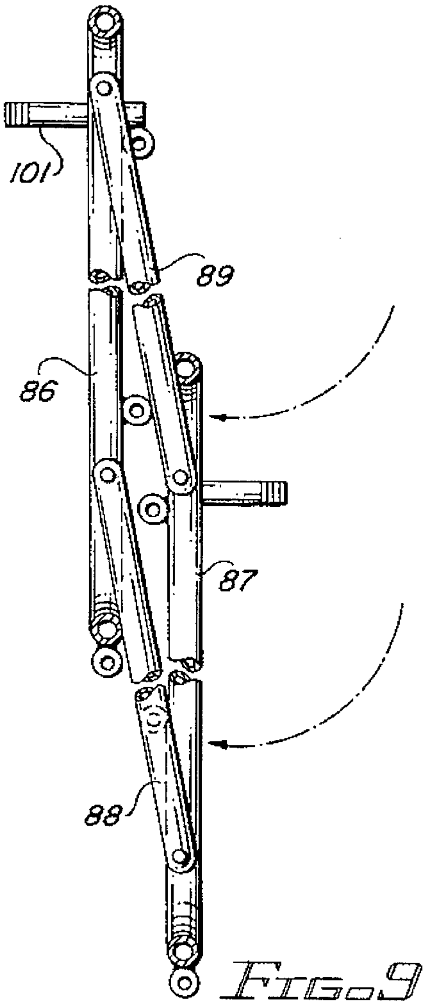
FIG. 9
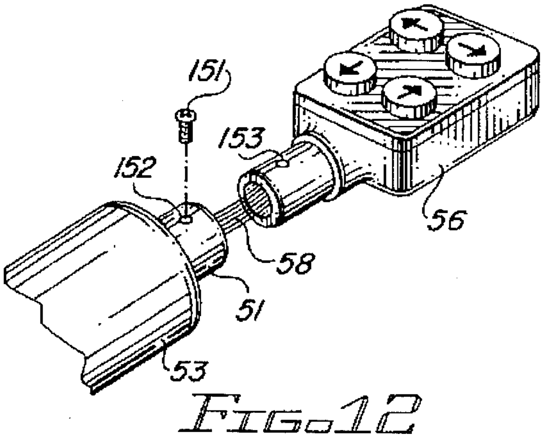
FIG. 12

WHEELCHAIR FOR CONTROLLED ENVIRONMENTS

CROSS-REFERENCE TO RELATED APPLICATION

This is a continuation of application Ser. No. 08/041,269, filed Apr. 1, 1993, and now abandoned.

BACKGROUND OF THE INVENTION

This invention relates to wheelchairs and, in particular, to a wheelchair for use in a controlled environment. By "controlled environment" is meant any area in which the production, spread or release of contaminants is prevented or minimized. Contaminants can be animate or inanimate, e.g. bacteria or particles of dust.

There are many occupations or tasks which must be performed in a controlled environment. The "cleanroom" used for the production of semiconductor wafers is an early but by no means the only example. Research and production in the electronic, aerospace, optical, recording, pharmaceutical, bio-tech, and medical industries must be done under strictly controlled environmental conditions. A cleanroom environment requires that particles not be generated, spread, or released in the cleanroom. In many applications, e.g. bio-tech, genetic engineering, and nuclear, the environment is controlled as much to keep contaminants in as it is to keep them out.

There is a problem in that many qualified, highly trained people cannot enter a cleanroom because cleanrooms typically do not permit wheelchair access. With at least 9,000 cleanrooms in the United States alone, this represents a significant restriction on people whose mobility is impaired.

Wheelchair access to a cleanroom is not simply a matter of scrupulously cleaning a wheelchair and placing it in a cleanroom. The tires, wheels, frame, and seat all retain or generate a large number of particles. The moving parts of a wheelchair generate particles and the tires pick up particles from the floor, particularly the rear wheels which can bring contaminants from the floor up to desk height. A wheelchair, especially the seat and back, can accumulate a static charge and attract particles and lint, perhaps also causing problems for the occupant, or a product being handled, when a grounded surface is touched.

A wheelchair suitable for a cleanroom is also suitable for aseptic environments such as hospitals. A wheelchair is widely recognized as a source of infection in hospitals. For example, the Health and Safety at Work Act in the United Kingdom establishes national guidelines for cleaning hospital wheelchairs. However, modern wheelchairs are typically complex mechanisms that are difficult to clean even when disassembled. A wheelchair for a cleanroom must be easy to clean and, therefore, is particularly suited to hospital use as well.

When not in use, a wheelchair takes up a considerable amount floor space, requiring a large vestibule adjacent a cleanroom. While there are many techniques for folding a wheelchair, the wheelchairs of the prior art typically have a large number of joints and adjustment holes, each of which can trap or produce particles. In addition, the interconnected braces obstruct the space underneath the seat.

In the prior art, it is known to provide brushes adjacent the wheels of a wheelchair to remove dirt adhering to the wheels, e.g. U.S. Pat. Nos. 2,740,643—Gordon and 4,605,239—Warfel. However, the wheelchairs described in these patents are unsuited for controlled environments because the dirt removed is macroscopic, e.g. mud from outdoors. The brushes would accumulate and shed large quantities of dust in a cleanroom.

In view of the foregoing, it is therefore an object of the invention to provide a wheelchair for controlled environments.

Another object of the invention is to provide a cleanroom wheelchair which can be stored relatively flat.

A further object of the invention is to provide a cleanroom wheelchair having a small surface area.

Another object of the invention is to provide a wheelchair which is easily cleaned and is suited to automated cleaning.

A further object of the invention is to provide an antistatic wheelchair for controlled environments.

Another object of the invention is to provide a cleanroom wheelchair having protective apparel attached to the chair.

A further object of the invention is to provide a wheelchair in which the sides, front and back form a parallelogram for folding and storage.

Another object of the invention is to provide a folding wheelchair having a large carrying space underneath the seat.

SUMMARY OF THE INVENTION

The foregoing objects are achieved in the invention in which a pair of tubular sideframes are interconnected by a seat and a backrest. Each sideframe is made from closed tubing bent into a "b" shape in which the seat rests on the middle bar of the "b". In one embodiment of the invention, pockets or sockets are welded to the sideframes for receiving pins on the underside of the seat. In another embodiment of the invention, the seat is attached to one sideframe by a hinge and attached to the other sideframe by pins engaging sockets on the sideframe. The backrest is connected to the posts of the "b" and is separated from the seat by a gap to avoid trapping contaminants. The wheels and tires are preferably electrically conductive. A pair of parallel, tubular braces interconnect the sideframes and are attached at each end by a pivoting joint, enabling the wheelchair to be folded with the sideframes moving past each other rather than toward each other as in the prior art.

Tacky rollers contacting the rear wheels are turned by the rear wheels, cleaning the wheels as the wheelchair rolls. In an alternative embodiment of the invention, the rear wheels are turned by the tacky rollers driven by a power unit mounted under the seat. The power unit is controlled from a keyboard attached to a tubular armrest on the wheelchair. Control and signal cables are located within the armrest, reducing the surface area which could trap contaminants. The armrest is attached to the sideframe by a rotating joint using "Teflon®" or other low particle generating plastic for a bearing.

In an alternative embodiment of the invention, a non-folding wheelchair has a frame made from a single piece of tubing, bent to form the seat and back support areas. Armrests and wheels are attached as for the other embodiments.

In accordance with another aspect of the invention, a protective garment is provided with the wheelchair to contain the contaminants in the clothing of the user. The garment is a zippered bag for enclosing the lower torso of the user and is zippered along one side to avoid placing a seam over the lap or legs of the user. The portion overlying the lap or legs of the user is a chemically resistant sheet for protecting the user.

BRIEF DESCRIPTION OF THE DRAWINGS

A more complete understanding of the invention can be obtained by considering the following detailed description in conjunction with the accompanying drawings, in which:

FIG. 2 is a section taken along line 2—2 in FIG. 1, showing the construction of a portion of the sideframe.

FIG. 3 is a section taken along line 3—3 in FIG. 1, showing the attachment of the backrest.

FIG. 8 is a top view of the frame of a wheelchair constructed in accordance with the invention.

FIG. 9 is a top view of a folded wheelchair constructed in accordance with the invention.

FIG. 11 is a detail showing the attachment of the power unit to the lower portion of a sideframe.

FIG. 12 illustrates the connection of a keyboard to an arm of a wheelchair constructed in accordance with the invention.

DETAILED DESCRIPTION OF THE INVENTION

Figure 1:
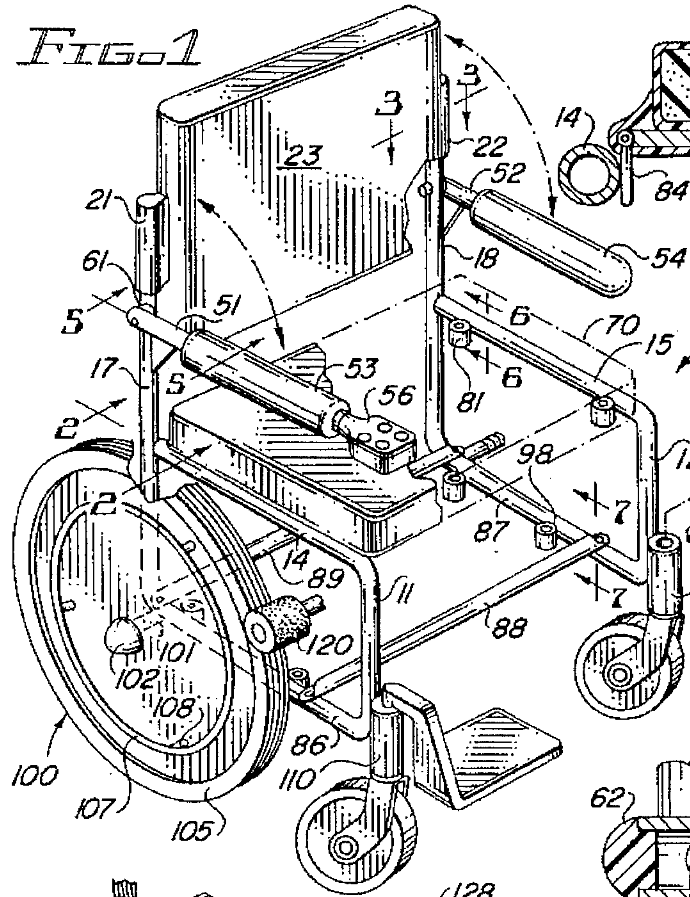
FIG. 1 is a perspective view of a wheelchair constructed in accordance with the invention.

FIG. 1, illustrates folding wheelchair 10 constructed in accordance with the present invention in which tubular sideframe 11 and tubular sideframe 12 are connected to move past by each other when wheelchair 10 is folded for storage. Each sideframe is a tube bent into the shape of a b having the open ends of horizontal tubes 14 and 15 welded to posts 17 and 18, respectively.

As illustrated in FIG. 2, horizontal tube 14 is preferably welded to post 17 by what is known as a fishmouth weld, indicated at 19. If horizontal tube 14 simply abutted post 17, tube 14 would actually touch post 17 in only two places because of the curvature of the post. The particular weld shown in FIG. 2, where in the end of tube 14 is shaped to fit the outside surface of post 17, assures that the end of tube 14 is completely closed and contaminants cannot be trapped in the end of tube 14.

In FIG. 1, the other end of sideframe 11 is closed by sleeve 21 which fits over the upper end of post 17. The upper end of post 18 is closed by sleeve 22. Backrest 23 is attached to sleeves 21 and 22, as shown in greater detail in FIG. 3.

In FIG. 3, backrest 23 includes cushion 30 attached to frame 31 by a plurality of snaps such as snap 32. Frame 31 is a sheet of plastic or composite material having sleeve 34 glued or otherwise attached to the edge of frame 31. Cushion 30 includes inner cover 35 containing a suitable filler, such as orthopedic gel 36, and outer cover 37 which surrounds cushion 30 and the sleeves attached to opposite edges of frame 31. Cover 37 is a breathable surface which contains particles from the filler and is cleanroom compatible. Polyester or Gorerex® are suitable materials for cover 37 and conductive threads or conductive material can be incorporated into the cover to improve static elimination.

Sleeves 21 and 22 are shorter than the sides of backrest 23 as illustrated in FIG. 1 and the upper ends of posts 17 and 18 are inserted fully into the sleeves. Sleeves 21 and 22 need only be long enough to adequately support backrest 23. Alternatively, the sleeves are longer, e.g. as long as the sides of backrest 23, and frictionally engage the upper ends of the posts to provide an adjustable height backrest. The height adjustment must always leave a gap between the backrest and the seat to prevent the formation of a crevice which can accumulate and release particles. If it is desired to adjust the orientation or shape of backrest 23, a wedge (not shown) can be inserted between cushion 30 and frame 31 to provide the desired contour for the back.

Figure 4:
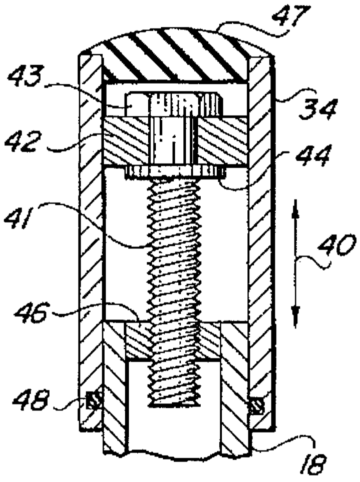
FIG. 4 is a cross-section of an adjustment mechanism for the backrest.

FIG. 4 illustrates an adjustment mechanism for holding the backrest at a particular height more securely than by friction between the sleeves and the posts. Specifically, sleeve 34 surrounds the upper end of post 18 and is free to move up and down along post 18 as indicated by arrow 40. Within sleeve 34, bolt 41 is attached to plug 42 which is attached to the inside of sleeve 34 by an adhesive. Bolt 41 can rotate within plug 42 but is prevented from moving longitudinally along sleeve 34 by bolt head 43 and collar 44. Bolt 41 engages threaded plug 46 in post 18. To adjust the height of the backrest, cap 47 is removed, bolt 41 is rotated in the appropriate direction to raise or lower the backrest, and the cap is replaced. Since bolt 41 can not turn on its own, the backrest is securely held in the desired position. 0-ring 48 seals the lower end of sleeve 34 to post 18, completing the enclosure of the open end of post 18.

In FIG. 1, the right-hand armrest includes tubular arm 51 attached at one end to post 17 and having pad 53 on the other end. The left-hand armrest includes tubular arm 52 attached at one end to post 18 and having pad 54 on the other end. For powered wheelchairs, keyboard 56 is attached to the outer end of the arm 51 and is electrically connected to suitable control circuitry by a cable extending through the inside of tubular arm 51. Arms 51 and 52 can rotate in a vertical plane and are each attached to posts 17 and 18 by a joint shown in more detail in FIG. 5.

Figure 5:
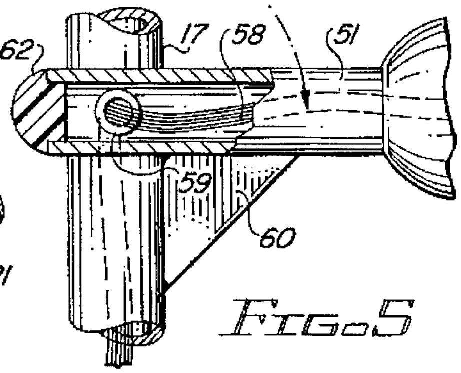
FIG. 5 is a section taken along line 5—5 in FIG. 1, showing the attachment of an arm.

FIG. 5 illustrates the mechanical and electrical connection between post 17 and arm 51. Cable 58, from keyboard 56 extends through arm 51 to hollow fastener 59 attaching arm 51 to post 17o The wires in cable 58 pass through the center of fastener 59 and extend down post 17 to other electronics such as a power unit for the wheels. Arm 51 is free to rotate about fastener 59 and is held in a horizontal position by brace 60. Teflon® washer 61 (FIG. 1) prevents the generation of particles by the movement of arm 51 relative to post 17. Cap 62 closes one end of tubular arm 51 and the connection to the keyboard closes the other end of arm 51. If no keyboard were provided, then a second cap is used to close the other end of arm 51. Alternatively, as illustrated in FIG. 1 on the left-hand armrest, the padding can be used to close the end of the tubing. The padding is preferably a resilient layer surrounded by the same type of cover as described above for backrest 23.

Figure 6:
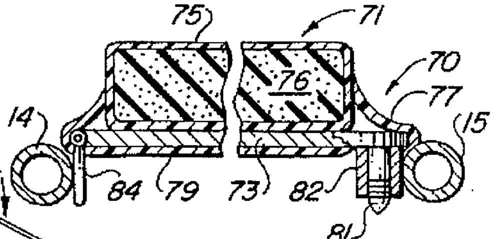
FIG. 6 is a section taken along line 6—6 in FIG. 1, showing the attachment of a seat.

FIG. 6 illustrates in greater detail the construction of seat 70 in accordance with the invention. In a preferred embodiment of the invention, seat 70 includes cushion 71 having cover 75 containing a suitable compressible filler, such as orthopedic gel 76. Platform 73 is a sheet of plastic or composite material and provides a firm support for the cushion. Cushion 71 is attached to platform 73 by snaps, not shown in FIG. 6. Since the small space between surface of platform 73 and the underside of cushion 71 could trap contaminants, it is preferred that elastic skirt 77 be sealed to cover 75 at the top of the skirt and expanded over platform 73 at the bottom of the skirt to enclose the volume between the underside of the cushion and the upper surface of platform 73. Cover 75 and skirt 77 are made from a non-porous material such as vinyl. The skirt includes an elastic band about the bottom for fitting over the platform.

If it is desired to adjust the shape of cushion 71, a wedge or additional padding (not shown) can be inserted between cushion 71 and plateform 73 to provide the desired contour for the cushion. If plateform 73 is not a particle-free material, then cover 79 is applied to the underside of platform 73.

Platform 73 includes pin 81 for insertion into socket 82. Socket 82 is welded to horizontal tube 15 and receives pin 81 attached to the underside of platform 73. Although illustrated as cylindrical, socket 82 and pin 81 can be tapered to assure a tight fit of the pin within the socket. A particle-free sleeve, such as Teflon®, is used to line the socket to prevent the generation of particles as the pin moves within the socket.

All four corners of the seat are secured to the sideframes by pins and sockets. Alternatively, as shown by the left-hand side of FIG. 6, one side of the seat is attached to horizontal bar 14 by hinge 84 welded to horizontal bar 14 and attached to plateform 73. The other side of plateform 73 is attached by pins to sockets welded to horizontal bar 15. In either configuration, seat 70 serves a dual purpose in supporting the occupant of the wheelchair and holding sideframes 11 and 12 in fixed spatial relationship.

In FIG. 1, lower horizontal tubes 86 and 87 of sideframes 11 and 12 are connected at the lower front by tubular brace 88 and at the lower rear by tubular brace 89. Braces 88 and 89 are attached to sideframes 11 and 12 by pivot connections permitting braces 88 and 89 to rotate in a horizontal plane as wheelchair 10 is folded. The separation of the sideframes is adjusted by using seats and backrests of the desired width and connecting braces of the appropriate length to the lower portions of the sideframes.

Figure 7:
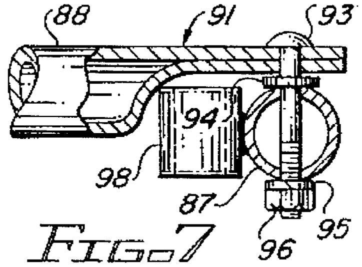
FIG. 7 is a section taken along line 7—7 in FIG. 1, showing the attachment of the lower brace.

FIG. 7 illustrates the connection between brace 88 and lower horizontal tube 87 of sideframe 12. Brace 88 has the end thereof collapsed to provide a reduced thickness portion 91. Bolt 93 through a hole in portion 91 extends through Teflon® washer 94 and tube 87. Bolt 93 is longer than the combined thicknesses of portion 91 and the outside diameter of tube 87 and protrudes from the underside tube 87 where it is secured by Teflon® washer 95 and nut 96. Socket 98 is welded to tube 87. Reduced thickness portion 91 extends along the length of brace 88 a sufficient distance to provide clearance for socket 98 as brace 88 pivots around bolt 93. The washers do not generate or retain particles as the brace moves relative to the sideframe. The ends of each brace are connected to the sideframes in the manner described.

FIGS. 8 and 9 illustrate the technique for folding a wheelchair constructed in accordance with the invention by moving the sideframes past one another, rather than toward each other as in wheelchairs of the prior art. Wheelchair 10 is folded by removing seat 70, if it is attached by pins, or tipping seat 70 to one side, if it is attached by a hinge. FIGS. 8 and 9 are top views of the lower portion of wheelchair 10 in which horizontal bars 86 and 87 and braces 88 and 89 form a rectangle. As sideframes 11 and 12 are moved past each other (FIG. 9), the horizontal bars and the braces form a parallelogram and the wheelchair folds relatively flat.

In FIG. 1, wheel 100 is mounted on axle 101 which is welded or clamped to sideframe 11. Hubcap 102 traps particles generated between axle 101 and the hub. Wheel 100 has a solid web extending from the hub to the rim and has tire 105 mounted thereon. Alternatively, four to six molded spokes are used to connect the hub to the rim. Particle attraction is minimized by using an static dissipative material for tire 105, preventing the accumulation of static charge on the wheelchair and its occupant. Suitable static dissipative materials include carbon impregnated plastic.

Hand rim 107 is attached to wheel 100 by a plurality of posts such as post 108. Each front caster is attached to a fitting, such as fitting 110, which is welded to the lower front portion of sideframe 12. Fitting 110 is preferably hollow at both the top and bottom. Footrest 112 is attached by pin 114 to the top of fitting 115. Footrest 112 is not hinged at the juncture of the horizontal and vertical plates thereof to eliminate a particle generating or trapping joint.

Dirt is removed from tire 105 by roller 120 having a tacky, cylindrical surface in contact with the periphery of tire 105. Suitable materials for the tacky layer are disclosed, for example, in U.S. Pat. No. 4,484,250, Rzepecki. The location of roller 120 is not critical, particularly in applications where the wheelchair is as likely to be rolling backward as it is likely to be rolling forward. In such case, a pair of rollers can be used on the front and rear of tire 105 to intercept particles picked up from the floor as tire 105 rolls forward and backward on the floor. In critical applications, smaller tacky rollers are mounted on the front casters as well.

As shown in FIG. 1, roller 120 is positioned ahead of tire 105, in a location corresponding to that for driving the wheels with a suitable motor. Thus, the tacky rollers provide two functions, cleaning the tires and coupling motive force to the wheels. Adjustment of the position of the rollers is not required since the rollers and tires are somewhat resilient. Each roller preferably includes a sleeve mounted on a drum wherein the sleeve is changed daily or every couple of days. An expandable elastomeric drum, as used for drum sanders, is used to hold the sleeve in place and to provide a slight adjustment in the diameter of the sleeve.

Figure 10:
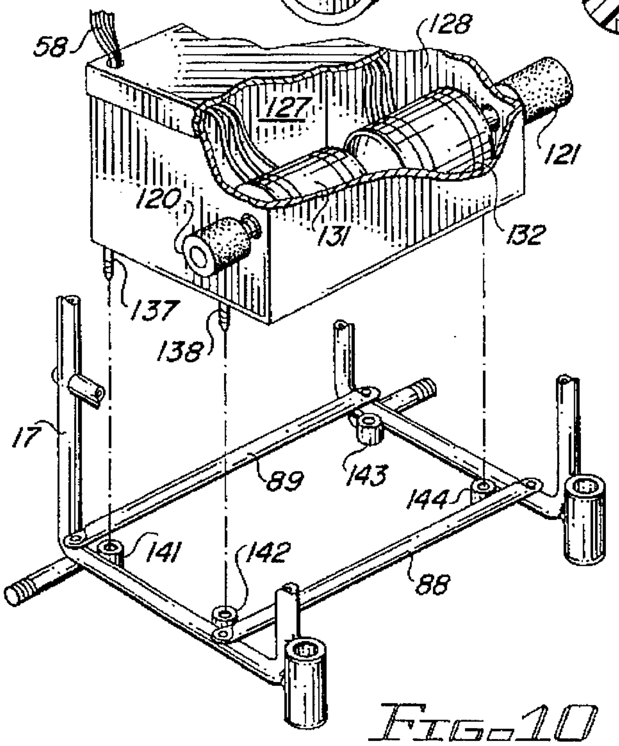
FIG. 10 is a perspective view of the lower portion of a wheelchair showing the attachment of a power unit.

FIG. 10 illustrates an enclosed power unit for driving wheelchair 10. The axles attached to rollers 120 and 121 pass through sealed rotating bushings in the side walls of power unit 125, within which batteries 127 and 128 supply electrical power for motors 131 and 132. Motors 131 and 132 are separately controlled, by suitable electronic circuitry known in the art, to provide full turning and maneuvering capability for the wheelchair. Cable 58 extends from one corner of power unit 125 into post 17 and through arm 51 to keyboard 56, as shown in FIG. 5. The axles on which rollers 120 and 121 turn are preferably the output shafts of motors 131 and 132. Alternatively, separate axles coupled to the output shafts of motors 131 and 132 can be used. In either case, the axles extend from the sidewalls of power unit 125 past the edges of the wheels on each side of the wheelchair.

Because of the simplified structure of a folding wheelchair constructed in accordance with the invention, the entire volume underneath seat 70 is available for accessories, such as power unit 125. In addition to or instead of power unit 125, other apparatus can be installed, depending upon the needs of the occupant. For example, there is room for a monitoring system for the user which transmits the user's medical condition or simply the user's location. A computer terminal connected to a network by way of a data link can also be installed beneath the seat. Whatever the apparatus, wheelchair 10 provides virtually all of the volume beneath the seat for storing the apparatus.

Referring to FIGS. 10 and 11, pins, such as pins 137 and 138, attached to the underside of power unit 125 are spaced in accordance with the locations of sockets 141–144 when wheelchair 10 is in an open position. Sockets 141–144 are welded to the lower horizontal bars of sideframe 11 and 12 and can be cylindrical or tapered.

FIG. 12 illustrates the mechanical connection between arm 51 and keyboard 56. Keyboard 56, in its simplest form, includes four buttons controlling the motion of wheelchair 10. Depending upon the nature of the particular handicap and the task to be performed, keyboard 56 could include a full "QWERTY" keyboard and a joy stick or track ball. The keyboard is connected to arm 51 by setscrew 151 through hole 152 in arm 51 and engaging dimple 153 in the shaft from keyboard 56. Cable 58 extends from keyboard 56 through arm 51 to power unit 125 as described above.

Figure 13:
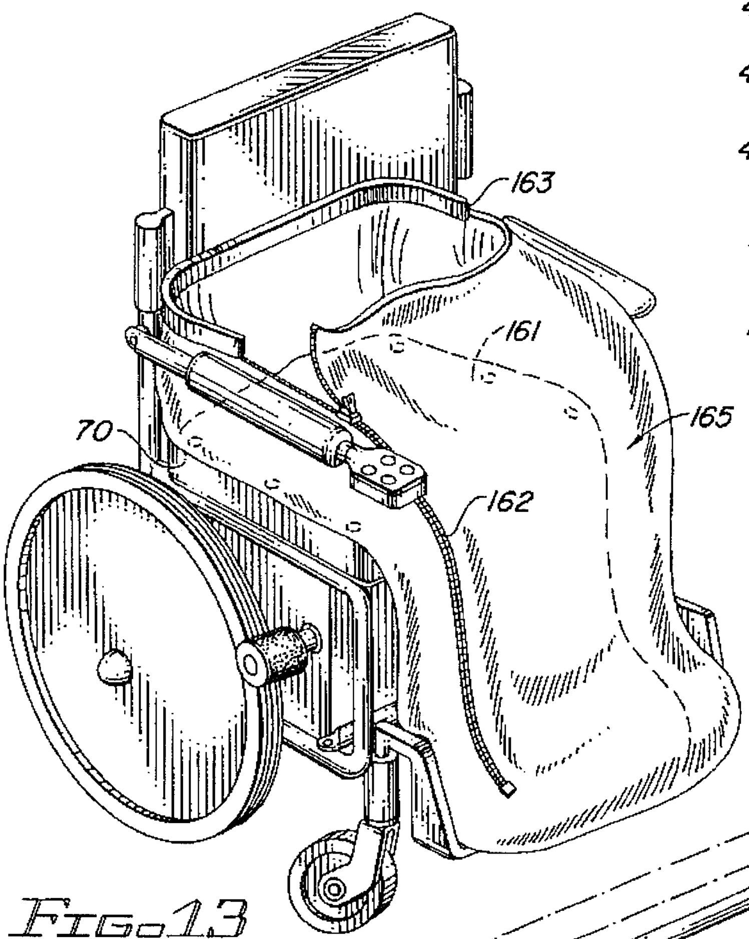
FIG. 13 is a perspective view of a wheelchair including a protective garment for the user.

FIG. 13 illustrates a suitable garment for use with the present invention in a clean room. Specifically, protective garment 160 is a zippered bag attached to seat 70 by suitable snaps such as snap 161. Zipper 162 extends down on one side of garment 160 to provide access for the user and elastic waist 163 secures the upper end of garment 160 to the user. Surface 165, overlying the lap of the user, can included a chemically resistant coating or protective layer, depending upon the particular application, for protecting the user from spills or radiation exposure.

The user gets into the wheelchair by raising arm 51 and unzippering garment 160. The user then slides onto seat 70 from the right-hand side of the wheelchair, wrapping his legs in garment 160, closing zipper 162, and lowering arm 51. The user may have previously donned an upper body garment or can don a suitable upper body garment at this time. The user is then fully protected and can enter a clean room without bringing in, producing, or leaving with contaminates.

Figure 14:
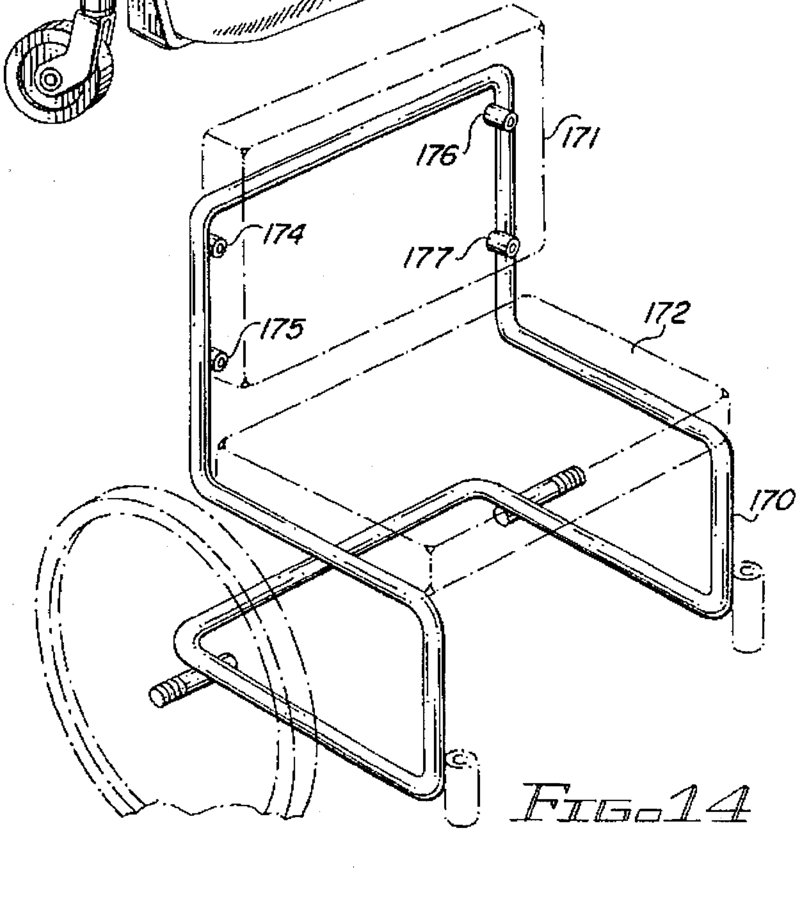
FIG. 14 is a perspective view of a non-folding wheelchair constructed in accordance with the invention.

FIG. 14 illustrates an alterative embodiment of the invention in which a single tube is bent to form frame 170 of a non-folding wheelchair. Backrest 171 is attached by pins (not shown) engaging sockets 174–177 welded to frame 170. Seat 172 is attached either by pins and sockets or a combination of pins and sockets and a hinge. The ends of the tube are welded together to close the tube and minimize the exposed surface area of the frame.

In a preferred embodiment of the invention the metal parts of the wheelchair have an integral outer surface or an integral coating. "Integral" means a durable, continuous surface that is intrinsically clean (does not produce particles) and is easily cleaned, mechanically stable, and chemically stable. A coating having these properties must also be adherent. "Paint" is intended to mean a suspension of particles in a solution from which one or more solvents evaporate as the paint dries. Paint is not a suitable coating for a wheelchair constructed in accordance with the invention since most if not all paints shed particles. Chrome plating is not suitable because it too sheds particles.

The preferred coating for the metal parts of the wheelchair is an electrostatic powder which is applied and then baked at high temperature, causing the electrostatically adherent particles to fuse together and to bond with the surface of the metal. The temperature of the bake depends upon the powder used, as known to those of skill in the electrostatic coating art, and is generally above 150° C. The electrostatic coating can be an epoxy, a ceramic, or other material meeting the characteristics described above. If a metal part is made from aluminum, a hard anodized finish can be used instead of an electrostatic coating.

Either electrostatic coatings or anodized layers are highly conformal, i.e. the coating has essentially the same thickness everywhere, unlike paint which is thicker in valleys and thinner on peaks of the underlying surface. Prior to being coated, the metal surfaces of the wheelchair need not be specular but preferably appear smooth to the unaided eye, with no pockets or crevices. All welds are ground smooth.

The invention thus provides a wheelchair for controlled environments and, in particular, a wheelchair which has a low surface area, is easily cleaned, and stores relatively flat. The height of the backrest is adjustable and the width of the wheelchair is adjustable, but there are no open holes to trap or produce contaminants. Protective apparel is attached to the chair to facilitate donning and removal. The chair can dissipate electrostatic charge through conductive wheels and tires and has a large carrying space underneath the seat.

Having thus described the invention, it will be apparent to those of skill in the art that various modifications can be made within the scope of the invention. For example, the sideframes preferably have a minimum number of welds and are preferably a single section of tubing bent into the shape of a b. Alternatively a plurality of shorter sections of tubing can be welded into the same shape. The sideframes can have other shapes, such as an h or an L instead of a b. If the sideframes are in the shape of an L, the seat rests on the power unit and the frame of the seat is attached to the top of the power unit by pins and sockets. Each axle for a rear wheel can be attached to a block clamped to a sideframe rather than welded to a sideframe. This permits adjustment of the position of the rear wheels to suit the needs of the user. The faces of the clamp blocks are sealed with a suitable compound such as silicone rubber. Handles for pushing the wheelchair can be inserted into sleeves 21 and 22 instead of the cap on the adjusting mechanism.

I claim:

1. A wheelchair for controlled environments, said wheelchair comprising:

a first sideframe;

a second sideframe;

a pair of braces pivotally attached to said sideframes, wherein the sideframes and the braces form a parallelogram and wherein said sideframes can move past each other;

a platform releasably interconnecting said first sideframe and said second sideframe for preventing the sideframes from moving relative to each other when said platform is connected to said sideframes wherein the first sideframe, the second sideframe, and the pair of braces each have a conformal coating on the outer surfaces thereof for reducing particle retention or particle generation in said controlled environment.

2. The wheelchair as set forth in claim 1 wherein said first sideframe and side second sideframe each comprises metal tubing and said conformal coating is an adherent coating of particles fused together and to said metal tubing.

3. The wheelchair as set forth in claim 1 wherein said first and second sideframes comprise aluminum tubing and said conformal coating is a hard anodized coating.

4. The wheelchair as set forth in claim 1 and further comprising:

a pair of wheels attached one each to said first sideframe and said second sideframe, wherein said wheels are sufficiently conductive to remove electrostatic charge from said wheelchair.

5. The wheelchair as set forth in claim 1 and further comprising:

a pair of wheels attached one each to said first sideframe and said second sideframe, wherein each of said wheels has a hub, a rim, and a solid web extending from said hub to said rim.

6. The wheelchair as set forth in claim 1 and further comprising:

a pair of wheels attached one each to said first sideframe and said second sideframe; and a pair of tacky rollers, each of said rollers touching one of said pair of wheels and removing and retaining contaminants from said wheels.

7. The wheelchair as set forth in claim 6 and further comprising:

an enclosed power unit attached between said sideframes for supplying motive power to said wheelchair;

said power unit having a pair of axles extending past said wheels;

wherein one of said rollers is attached to each of said pair of axles.

8. The wheelchair as set forth in claim 7 and further comprising:

a tubular arm having a first end attached to one of said sideframes and a second end;

an electronic keyboard attached to said second end; and a cable connected to said keyboard and extending through the inside of said tubular arm to said power unit.

9. The wheelchair as set forth in claim 1 wherein (i) each brace has a first end and a second end;

(ii) the first end of each brace is attached to said first sideframe and the second end of each brace is attached to said second sideframe; and (iii) each brace can move in a horizontal plane.

10. The wheelchair as set forth in claim 1 wherein said first sideframe includes a vertical post and said second sideframe includes a vertical post, and further comprising:

a backrest including a first sleeve fitting over the vertical post of said first sideframe and a second sleeve fitting over the vertical post of said second sideframe.

11. The wheelchair as set forth in claim 10 wherein said sleeves frictionally engage said vertical posts.

12. The wheelchair as set forth in claim 10 wherein said sleeves each include an adjustment mechanism for vertically locating said backrest.

13. The wheelchair as set forth in claim 10 wherein said backrest includes:

a frame connected between said sleeves;

a cushion attached to said frame; and a skirt attached to said cushion and surrounding said frame and said sleeves for enclosing the space between said cushion and said frame.

14. The wheelchair as set forth in claim 1 and further including:

a cushion attached to said platform; and a skirt attached to said cushion and surrounding said platform for enclosing the space between said cushion and said frame.

15. The wheelchair as set forth in claim 1 wherein said first sideframe includes a pair of sockets and wherein said platform includes a pair of pins adapted to engage said pair of sockets.

16. The wheelchair as set forth in claim 15 wherein said first sideframe and said second sideframe each include a pair of sockets and said platform includes two pair of pins adapted to engage said two pair of sockets and to locate the sideframes in fixed spatial relationship.

17. The wheelchair as set forth in claim 15 wherein said first sideframe includes said sockets and said second sideframe includes a hinge attached to said platform, wherein said platform locates said sideframes in fixed spatial relationship.

18. The wheelchair as set forth in claim 15 and further comprising a protective garment attached to said seat for enclosing the lower torso and legs of a user.

19. The wheelchair as set forth in claim 18 wherein said protective garment includes a chemically resistant portion overlying the lap of a user.

* * * * *